United States Patent Office 3,455,664  
Patented July 15, 1969

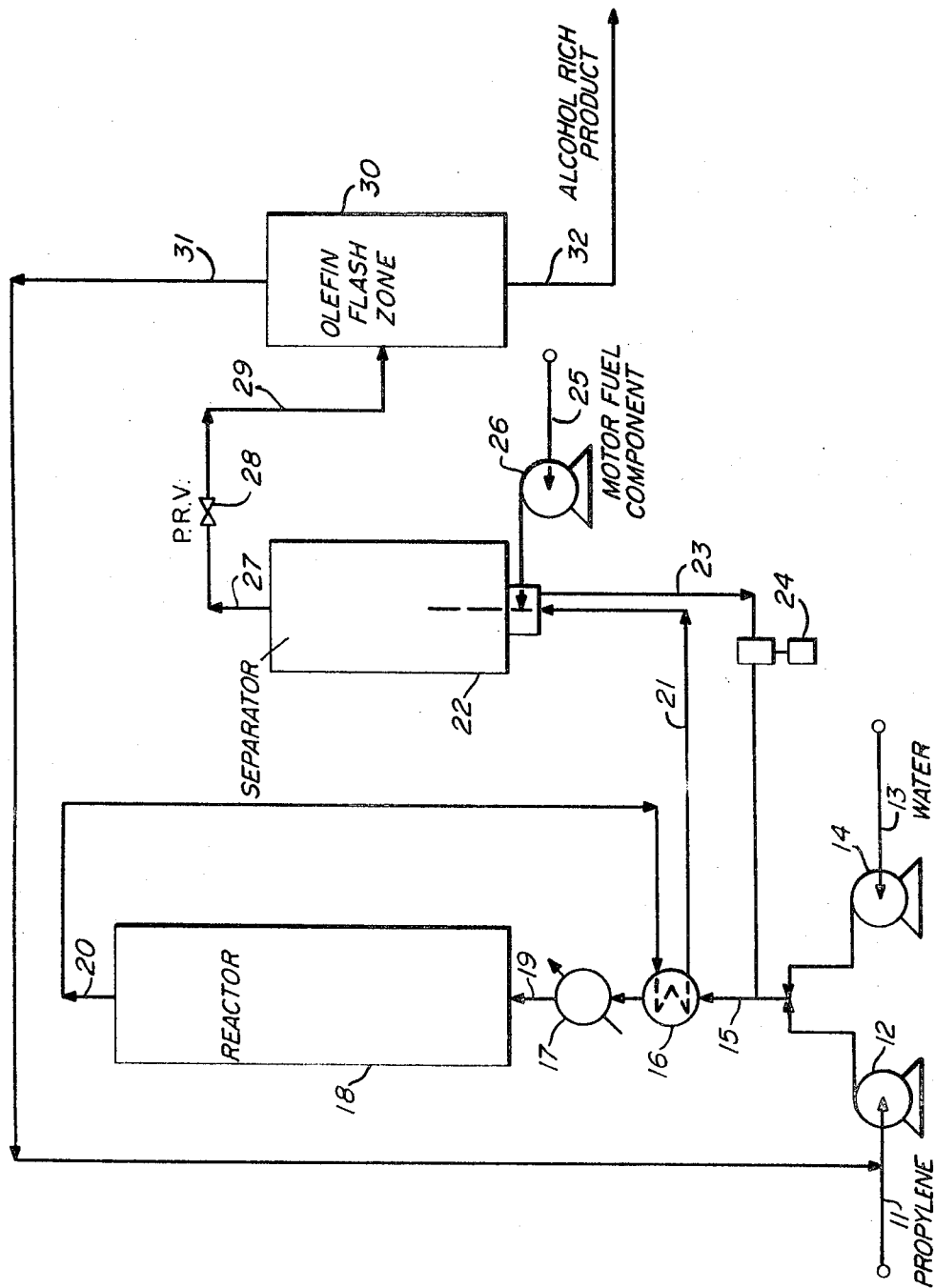

---

3,455,664  
PRODUCTION OF MOTOR FUELS  
Robert J. Rosscup, Valparaiso, Ind., and Alex Zletz, Chicago Heights, and Luke A. Schaap, South Holland, Ill., assignors to Standard Oil Company, Chicago, Ill., a corporation of Indiana  
Filed June 30, 1966, Ser. No. 561,781  
Int. Cl. C10l 1/02  
U.S. Cl. 44—56                                6 Claims

---

ABSTRACT OF THE DISCLOSURE

Process for the production of a motor fuel containing isopropyl alcohol by introducing a motor fuel component into the reaction product of the reaction comprising the high pressure catalytic hydration of propylene.

---

This invention relates to a process for the production of motor fuels, and more particularly to a process for direct incorporation of isopropyl alcohol into motor fuels.

Incorporation of isopropyl alcohol in a motor fuel has been found to be quite beneficial for the following reasons: alcohol has a decided effect in improving the octane number of gasolines; it is used as a de-icer additive; and it generally improves the low temperature properties of the gasoline. The percentage of alcohol to be incorporated in the gasoline, will depend upon its intended use, as indicated above. For increasing octane in unleaded gasolines 5 to 15 percent by volume may be incorporated into the gasoline. To improve anti-icing properties less than 3 percent may be added.

The incorporation and blending of isopropyl alcohol into a gasoline may be a time-consuming and laborious procedure, involving the production of alcohol, the purification of the alcohol, the production of the motor fuel, measurement of the correct percentage of alcohol, and the incorporation of the alcohol into the fuel. This procedure has many inherent disadvantages.

We have now discovered a process for the direct incorporation of isopropyl alcohol, produced by the direct catalytic hydration of propylene, into a motor fuel. By this process the alcohol-containing motor fuel is prepared without the necessity of performing many of the steps above outlined. For example, purification and measurement of alcohol becomes unnecessary. Very briefly, the process of this invention comprises catalytically hydrating a water-propylene mixture in a reaction zone under high pressure conditions, introducing a motor fuel component into the reaction product, forming a water-rich phase and an organic-rich phase, recycling under high pressure conditions the water-rich phase back into the reaction zone, and withdrawing the alcohol-containing motor fuel component. The motor fuel components may be any unsaturated component which would ordinarily extract alcohol from water, e.g. reformate, unsaturated naphthas, benzene, toluene, xylene, aromatic alkylates, and other substituted aromatics, etc. The component is injected into the effluent from high pressure hydration of propylene. The stream may be cooled by heat exchange and sent to a separator. The introduction of the motor fuel component, in addition to extracting substantially anhydrous alcohol for direct incorporation into the fuel, has the added advantage of separating the reaction product into two phases: the upper phase contains any unconverted propylene, the motor fuel component with nearly all of the alcohol plus a small amount of water, and the lower phase contains water, with a small amount of alcohol. The lower water-rich phase is removed and recycled to the reactor while the organic-rich phase is depressured and used as such, or further purified by flashing off and recycling propylene and removing any water present. The alcohol-containing motor fuel component may then be blended in a motor fuel, since the process of this invention introduces all or more of the alcohol needed for the purposes above mentioned. The volume of the fuel component added should be adjusted so as to provide the correct quantity of alcohol in the fuel.

In the accompanying drawing, the figure is a schematic flow diagram illustrating a particular embodiment of the invention.

More specifically, the process comprises contacting in a catalytic zone a wholly liquid phase water-propylene mixture at a temperature in the range of 200 to 550° F. and a pressure in the range of 2,000 to 100,000 pounds per square inch, with a suitable catalyst introducing a motor fuel component into the reaction product, separating the resulting organic-rich phase from the water-rich phase in a separation zone, purifying the organic-rich phase, and recycling the water-rich phase to the catalytic zone under the above high pressure conditions.

A preferred mode of operation is as follows: propylene and water, in a mole ratio of between 0.25 and 20 moles of water per mole of propylene, advantageously between 1 and 15, is contacted in a catalytic zone, at a temperature in the range of 200 to 550° F., advantageously 250 to 500, and a pressure in the range of 2,000 to 100,000 p.s.i. in the presence of a catalyst. The following catalysts are suitable: silica-alumina, preferably comprising 10 to 30 percent alumina and 90 to 70 percent silica by weight in substantially uniform composition, silica-magnesia, acidic clays, reduced tungsten oxides, acidic organic ion exchange resins, such as Amberlyst 15 (polystyrene divinyl benzene sulfonic acid resin), sulfonic acids, phosphonic acids, etc. The hydration reaction may be carried out at a weight hourly space velocity of 0.1 to 20 parts of said water-propylene mixture per part of catalyst by weight. The reaction products are then removed from the catalytic zone, while maintaining reaction pressures. The motor fuel component is then introduced into the reaction products, which are passed to a separation zone. The separation zone is maintained at reaction pressure and at a temperature which may be in the range of from ambient to reaction temperature, but which is advantageously below reaction temperature and preferably below 300° F. In the separation zone the products form an upper organic-rich phase and a lower aqueous-rich phase. The lower phase is recycled to the catalytic zone with an application of heat, to a temperature suitable for the reaction. The upper phase is then drawn off, depressured to a pressure in the range of 0 to 50 atmospheres, preferably 1 to 10, and transferred to a flash zone which may be a simple distillation column or drum. This is done to remove unconverted propylene which may have been present in the product. The propylene is compressed and heated during recycle to the catalytic zone. The alcohol-containing motor fuel component may be sent directly to fuel blending or may be dehydrated, as by molecular sieve adsorption before going to blending.

The quantity of unsaturated motor fuel added to the reactor effluent depends on the water-to-proylene ratio used at the start and the level of conversion achieved.

It is desirable that the depressurization of the upper phase after removal from the separation zone be as limited as possible. In other words, it is preferred to maintain the upper phase at the highest pressure which allow unconverted propylene to flash off. This is desirable since the propylene should be recycled and introduced into the catalytic zone at the high pressures originally required in the reaction. The limitation then, on the uppermost limit of the pressure will be related to the critical condition of propylene.

In performing the process of this invention it may be desirable that the separation zone not be removed from the reaction zone, i.e. the reaction may comprise a catalytic zone and a separation zone. If such a system is used, alcohol may be drawn off and purified. It is usually advantageous however to provide a separation zone which is removed from the catalytic or reaction zone.

Compositions of the phases in the separator must be distinguished from the compositions of product that appears after flashing the olefin. If insufficient organic layer is formed in the separation zone for the rate of withdrawal, aqueous phase will also be removed and the concentration of alcohol in the product will be deceptively low.

Operating parameters need to be carefully adjusted to achieve operation where sufficient organic phase is formed so that no aqueous phase is removed. Make-up water, water recycle, propylene feed rate, total space velocity, nature and quantity of the motor fuel component added and product withdrawal all control both conversion to alcohol and ratio of phases formed in the separator for a given pressure, temperature and catalyst.

If the ratio of make-up water, recycle water and space velocity are too great for the amount of propylene pumped, a small amount of organic phase will be formed and aqueous layer may also be withdrawn and collected with the organic layer. If insufficient water is pumped to compensate for that consumed in making alcohol and if ratio of propylene pumped is high, the total aqueous phase decreases in volume; the amount of organic phase increases and builds up in the separation zone. By carefully adjusting feed rate of the motor fuel component, it is possible to optimize production and withdrawal. Thus, it is evident that feed and recycle parameters require careful adjustment to achieve an over-all steady state operation.

The separator temperature is also an important factor. The choice of temperature will depend upon the critical conditions for propylene feed. The critical conditions for propylene are 198.1° F. and 661.5 p.s.i. Generally, the higher temperature leads to a decrease in alcohol to water ratio, i.e. selectivity for alcohol, hence as low a temperature as feasible should be used, preferably below 300° F. and still more preferred, below 200° F.

Flow direction in the separator reactor system may affect composition in the reactor during the run and, consequently, the product composition. But for the most part, the effect of flow direction on the alcohol to water ratio or on production rates is small. Therefore, up-flow or down-flow may be used in the process of this invention.

The present invention is specifically described with reference to the figure. Propylene feed enters through line 11 and is compressed by means of high pressure pump 12. Water feed enters through line 13 and is compressed by means of high pressure pump 14. The olefin-water mixture is then passed through line 15 under pressure, through heat exchanger 16 and heater 17, so that the mixture will be at the desired temperature upon entering reactor 18 through line 19. After reaction the product is drawn off at the top of reactor 18 through line 20 and is fed through heat exchanger 16 in order to cool the product. The product is then fed through line 21 to separating zone 22. The motor fuel component enters line 21 through line 25 and is compressed by pump 26. The product separates into two phases in separating zone 22. The lower aqueous phase is drawn off at the bottom of separator 22 through line 23 and recycled to line 15 by means of recycle pump 24. The upper organic phase is drawn off at the top of separator 22 through line 27 and depressured by means of pressure release valve 28. The depressed product is fed by line 29 to olefin flash zone 30, where the unconverted olefin is recovered and recycled by line 31 back to olefin feed line 11. The remaining portion of the organic phase, i.e. the alcohol-rich portion, is drawn off at the bottom of olefin flash zone 30 through line 32 and fed to a purification zone (not shown) where the alcohol may be purified by such means as distillation, adsorption, extraction, etc., or it may be blended as such without further purification.

We claim:
1. A process for the preparation of isopropyl alcohol-containing motor fuel which comprises:
    (a) catalytically hydrating in a catalytic zone a water-propylene mixture at a temperature in the range of 200 to 550° F. and a pressure in the range of 2,000 to 100,000 p.s.i.;
    (b) introducing an aromatic motor fuel component into the reaction product;
    (c) forming an alcohol-rich phase and a water-rich phase in a separation zone, said separation zone maintained at a pressure in the range of 2,000 to 100,000 p.s.i. and a temperature no greater than the temperature of said catalytic zone;
    (d) removing said water-rich phase from said separation zone and recycling said water-rich phase to said catalytic zone while maintaining pressure in the range of 2,000 to 100,000 p.s.i.; and
    (e) withdrawing the alcohol-containing aromatic motor fuel component.

2. The process of claim 1 wherein said catalytic zone comprises a silica-alumina catalyst.

3. The process of claim 2 wherein said silica-alumina catalyst comprises 10 to 30 percent alumina and 90 to 70 percent silica by weight in substantially uniform composition.

4. A process for the preparation of isopropyl alcohol-containing motor fuels which comprises:
    (a) contacting in a catalytic zone a water-propylene mixture, in the mole ratio of between 0.25 and 20 moles of water per mole of propylene, at a temperature in the range of 200 to 550° F. and a pressure in the range of 2,000 to 100,000 p.s.i. with a silica-alumina catalyst, at a weight hourly space velocity of 0.1 to 20 parts of said water-olefin mixture per part of catalyst by weight;
    (b) removing and passing, under said high pressure conditions, the products from said catalytic zone to a separation zone, said separation zone being maintained at a pressure in the range of 2,000 to 100,000 p.s.i. and at a temperature no greater than the temperature of said catalytic zone;
    (c) introducing an aromatic motor fuel component into said separation zone;
    (d) forming an upper organic-rich phase and a lower aqueous-rich phase in said separation zone;
    (e) removing and recycling said lower phase back to said catalytic zone while maintaining the pressure in the range of 2,000 to 100,000 p.s.i.;
    (f) drawing off and depressuring said upper phase;
    (g) transferring said depressured upper phase to a flash zone;
    (h) removing unconverted olefin from said flash zone;
    (i) compressing and heating said unconverted olefin during recycle to said catalytic zone; and
    (j) removing alcohol-containing motor fuel component from said flash zone.

5. The process of claim 4 wherein said upper phase is depressured to a pressure in the range of 0 to 50 atmospheres.

6. The process of claim 4 wherein said isopropyl alcohol in said motor fuel component is further dehydrated.

References Cited

UNITED STATES PATENTS

| | | |
|---|---|---|
| 2,221,955 | 11/1940 | Schneider. |
| 2,663,744 | 12/1953 | Lukasiewicz et al. |
| 2,807,652 | 9/1957 | Carrier. |
| 2,827,500 | 3/1958 | Bloecher et al. |
| 2,870,217 | 1/1959 | Toland. |
| 2,994,720 | 8/1961 | Hakala et al. |
| 3,081,312 | 3/1963 | Long et al. |
| 3,328,471 | 6/1967 | Kronig et al. |

FOREIGN PATENTS

| | | |
|---|---|---|
| 202,388 | 1/1956 | Australia. |
| 646,056 | 7/1962 | Canada. |

LEON ZITVER, Primary Examiner

J. E. EVANS, Assistant Examiner

U.S. Cl. X.R.

44—53; 260—641, 643